United States Patent [19]
Shinkawa

[11] Patent Number: 5,287,005
[45] Date of Patent: Feb. 15, 1994

[54] ACTUATOR CONTROL DEVICE FOR AUTOMOBILE AIR CONDITIONERS

[75] Inventor: Masaki Shinkawa, Tokyo, Japan

[73] Assignee: Harada Kogyo Kabushiki Kaisha, Tokyo, Japan

[21] Appl. No.: 662,559

[22] Filed: Feb. 28, 1991

[30] Foreign Application Priority Data

Mar. 1, 1990 [JP] Japan .................. 2-50184

[51] Int. Cl.$^5$ .................. H01H 1/18; H01R 23/00; H02P 1/22; H02P 3/00
[52] U.S. Cl. .................. 307/10.1; 200/1 V; 200/51.05; 200/241; 318/293
[58] Field of Search ............... 200/1 V, 1–18, 200/178, 179, 23, 51.03, 51.05, 241, 252; 307/10.1, 9.1; 318/293; 361/245, 246

[56] References Cited

U.S. PATENT DOCUMENTS

| | | | |
|---|---|---|---|
| 2,453,498 | 11/1948 | Crowley | 200/16 D |
| 3,632,936 | 1/1972 | Piber | 200/1 V |
| 4,074,099 | 2/1978 | Steen | 200/1 V |
| 4,527,103 | 7/1985 | Kade | 318/293 |

*Primary Examiner*—Jeffrey A. Gaffin
*Assistant Examiner*—Richard Elms
*Attorney, Agent, or Firm*—Koda and Androlia

[57] ABSTRACT

An actuator control device used for, for instance, dampers of automobile air conditioners including first and second fixed contacts which are discontinuous on a path along which a movable contact travels and third and fourth fixed contacts which are also in a discontinuous fashion on the movable contact's path. A motor, that is, an actuator, is connected to a battery and rotated forward when the movable contact is in contact with the first contact and is rotated reversely when the movable contact is in contact with the third contact, thus opening and closing the damper. A first diode is connected to the second contact so that when the damper, which is rotated in a linkage with the movable contact, is opened and the movable contact comes into contact with the second contact, the first diode cuts off the current to the motor, thus completing the damper opening action. A second diode is used so that when the damper is closed and the movable contact comes into contact with the fourth contact, the second diode cuts off the current to the motor, completing the closing action.

3 Claims, 3 Drawing Sheets

ACTUATOR CONTROL DEVICE FOR AUTOMOBILE AIR CONDITIONERS

BACKGROUND OF THE INVENTION

1. Field of the Invention

The present invention relates to an actuator control device for automobile air conditioners.

2. Description of the Related Art

A device that uses transistors is known as one of the means to secure such a stopping precision. In particular, transistors are used for short-circuiting the motor and are switched on at the closed position and maximum-opened position of the damper. For example, a switch that is connected to the damper is used so that the switch is actuated respectively at the closed position and maximum-opened position of the damper. When the switch is actuated, transistors are switched on so that the motor is short-circuited, thus stopping the damper.

Meanwhile, another type of device is also known in which a damper is mechanically stopped when it is at a closed position and a maximum-opened position.

If, however, the damper is stopped by transistors as described above, the overall cost of the actuator control section is increased.

On the other hand, in the mechanism in which the damper is stopped mechanically at the closed position and at the maximum-opened position, the durability is usually low.

SUMMARY OF THE INVENTION

In automobile air conditioners, it is necessary to drive various dampers to alter the conditions of air conditioning. For example, the amount of air to be blown out is controlled by changing the degree of opening of the damper installed at the air outlet. When the damper provided at the air outlet is going to be closed, or when the damper is rotated in the opposite directions so as to be opened, an actuator is used. Usually, an electric motor is the actuator, and the direction of the rotation of the damper is changed by switching the polarity of the power supply for the motor.

It is also necessary that the damper accurately stops its rotation at predetermined angles for its closed position and for its maximum-opened position that is a position in which the damper is opened to its largest extent. As to these stop positions, usually angles of 2 to 3 degrees different (+ or −) from the predetermined stop angles are allowed, and it is necessary to maintain the accuracy so that the damper stops within such range of angles.

The object of the present invention is, accordingly, to provide an actuator control device for an automobile air conditioner which makes it possible to reduce the overall cost of the actuator control device and also to improve the durability of the dampers.

DESCRIPTION OF THE PREFERRED EMBODIMENT

The device of the present invention is designed in the following manner: A first fixed contact and a second fixed contact are installed discontinuously with respect to each other on a path along which a movable contact, that moves together with a damper, etc., travels. A third fixed contact and a fourth fixed contact are also installed discontinuously with respect to each other on the path along which the movable contact moves. A first diode is installed which short-circuits a motor when the movable contact comes into contact with the second fixed contact, and a second diode is installed which short-circuits the motor when the movable contact contacts the fourth fixed contact. With such a structure in which the damper is moved together with the movable contact, power that causes the motor to rotate in the forward direction is supplied via the movable contact and the first contact, and power that causes the motor to rotate in the reverse direction is supplied via the movable contact and the third fixed contact. Also, when the movable contact contacts the second fixed contact, the motor is short-circuited via the first diode, and when the movable contact contacts the fourth fixed contact, the motor is short-circuited via the second diode.

In the present invention, when the damper reaches the closed position or the maximum-opened position, the movable contact comes into contact with the second fixed contact or the fourth fixed contact so that the motor is short-circuited via the first diode or the second diode. Accordingly, there is no need to use transistors, thus reducing the overall cost of the actuator control device. In addition, since the damper is stopped by short-circuiting the motor, the stopping precision is high, and since the damper is not stopped mechanically, the durability of the damper can be improved.

Figure 1:
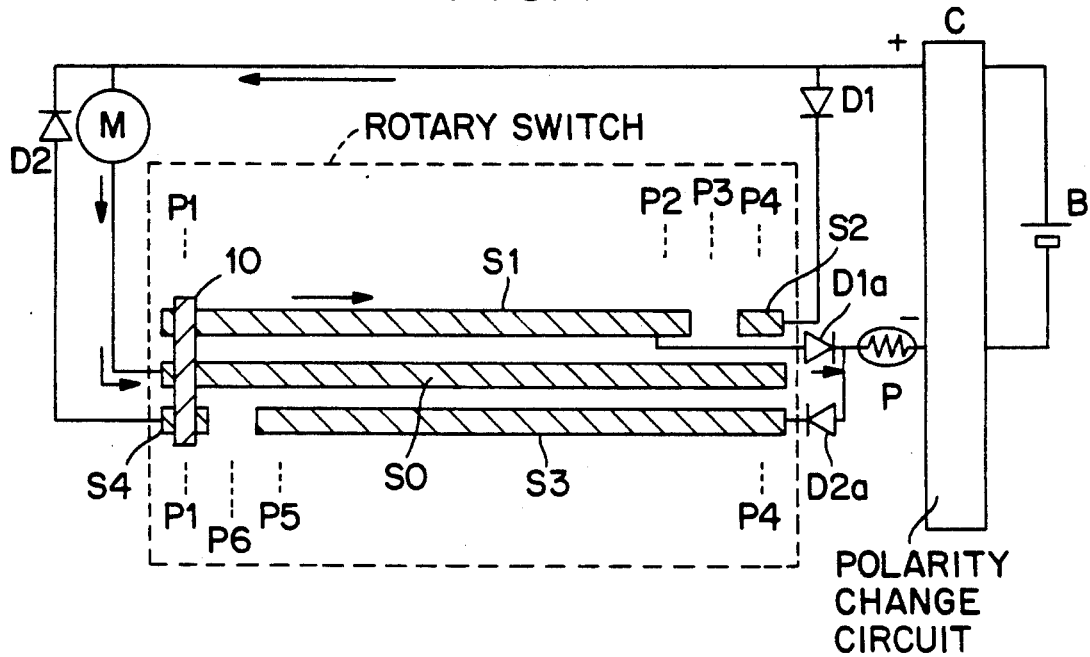
FIG. 1 is an explanatory diagram illustrating one embodiment of the present invention.

FIG. 1 is an illustration showing a basic structure of an embodiment of the present invention.

The actuator controller device has: a battery B; a polarity switching circuit C which switches the polarity of the battery B; a rotary switch RS; a motor M which is an example of actuator; diodes D1, D1a, D2 and D2a; and a posistor P.

The rotary switch RS has a movable contact 10, a fixed contact S0, a first fixed contact S1, a second fixed contact S2, a third fixed contact S3 and a fourth contact S4. The movable contact 10 slides along the fixed contacts S0 through S4. In actuality, the fixed contacts S1 and S2 are arc-shaped conductors which are placed on the circumference of the same circle, and the fixed contacts S3 and S4 are also arc-shaped conductors which are placed on the circumference of a same circle. The fixed contact S0 is a circular-arc-form conductor, too. However, for convenience of description, these elements are shown as linear strips. The fixed contact S0 is used commonly to other fixed contacts and is installed between the motor M and the movable contact 10.

Figure 2:
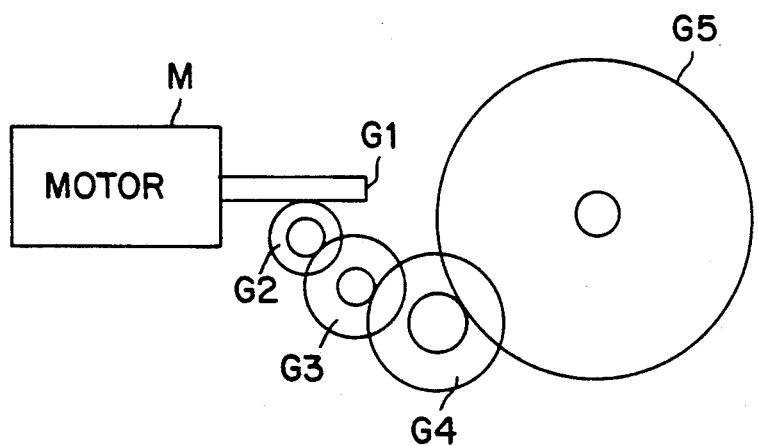
FIG. 2 is a diagram which illustrates the relationship between the damper and the actuator control device in the embodiment.

FIG. 2 shows the relationship between the damper and the actuator control device.

In FIG. 2, the motor M and gears G1, G2, G3, G4 and G5 are linked. The gear G5 is linked with a damper (not shown), and the gear G5 is also linked with the movable contact 10 of the rotary switch RS. When the damper reaches its closed position, the movable contact 10 is positioned at P1, and when the damper reaches its maximum-opened position, the movable contact 10 is positioned at P4.

The polarity switching circuit C does not merely switch the polarity but also controls the flow of a current to the motor M.

As seen in FIG. 1, the first fixed contact S1 and the second fixed contact S2 are conductors which are installed discontinuously with each other on a path along which the movable contact 10 travels. Also, the third fixed contact S3 and the fourth fixed contact S4 are conductors which are installed discontinuously with each other on the path along which the movable contact 10 travels.

The battery B, an example of a power supply, supplies power to the motor M via the movable contact 10 and the first fixed contact S1 and also supplies power to the motor M via the movable contact 10 and the third fixed contact S3.

The diode D1 short-circuits the motor M via the movable contact 10 and the second fixed contact S2, while the diode D2 short-circuits the motor M via the movable contact 10 and the fourth fixed contact S4.

Diodes D1a and D2a prevent the back-flow of electric current. The posistor P is a protective circuit which prevents an over-flow current when a shorting between the first fixed contact S1 and the second fixed contact S2 or a shorting between the third fixed contact S3 and the fourth fixed contact S4 occurs.

A stopper (not shown) is installed as a safety measure in order to insure that the damper is prevented from moving any further once it has reached its maximum-opened position or its closed position. However, the stopper can be omitted.

Next, the operation of the embodiment will be described.

First, when the damper (not shown) is in the closed position, the movable contact 10 is in contact with the left end of the first fixed contact S1 and the fourth fixed contact S4. This is shown in FIG. 1. When the motor M is powered via the polarity switching circuit C under this condition, current flows in the direction indicated by the arrows in FIG. 1. Specifically, current flows from the positive terminal of the battery B to the polarity switching circuit C, the motor M, the common fixed contact S0, the movable contact 10, the first fixed contact S1, the diode D1a and to the negative terminal of battery B. As a result, the damper is gradually closed, and the movable contact 10 moves, along with the damper, from left to right in FIG. 1. Slightly before the damper reaches its closed position, the movable contact 10 reaches position P3. At this point, the movable contact 10 releases its contact with the first fixed contact S1; as a result, electrical current is no longer supplied to the motor M, and the motor rotates only by the inertia.

Figure 3:
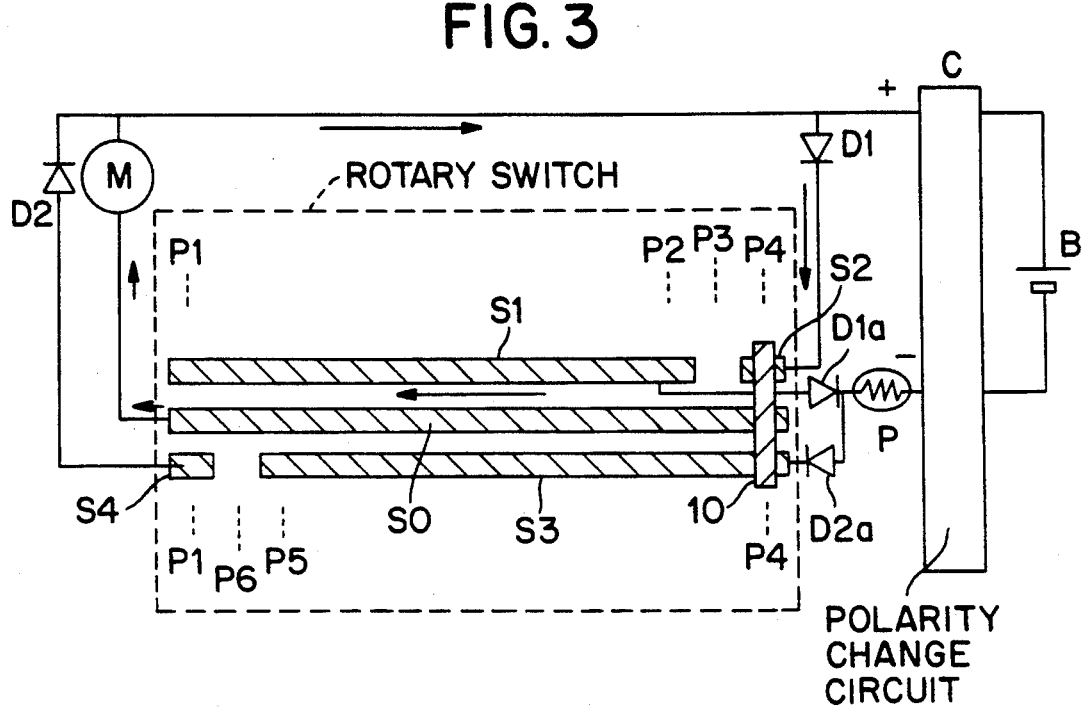
FIGS. 3, 4 and 5 are explanatory diagrams showing the operation of the embodiment.

Immediately after this, the movable contact 10 reaches position P4 and comes into contact with the second fixed contact S2. As a result, the motor M is short-circuited via the diode D1. In this case, as shown in FIG. 3, the energy accumulated in the motor M is discharged via the diode D1, and the motor M stops instantly. At this time, since the damper is positioned in the closed position, the damper stops accurately at its closed position. In other words, the stopping precision is high.

Figure 4:
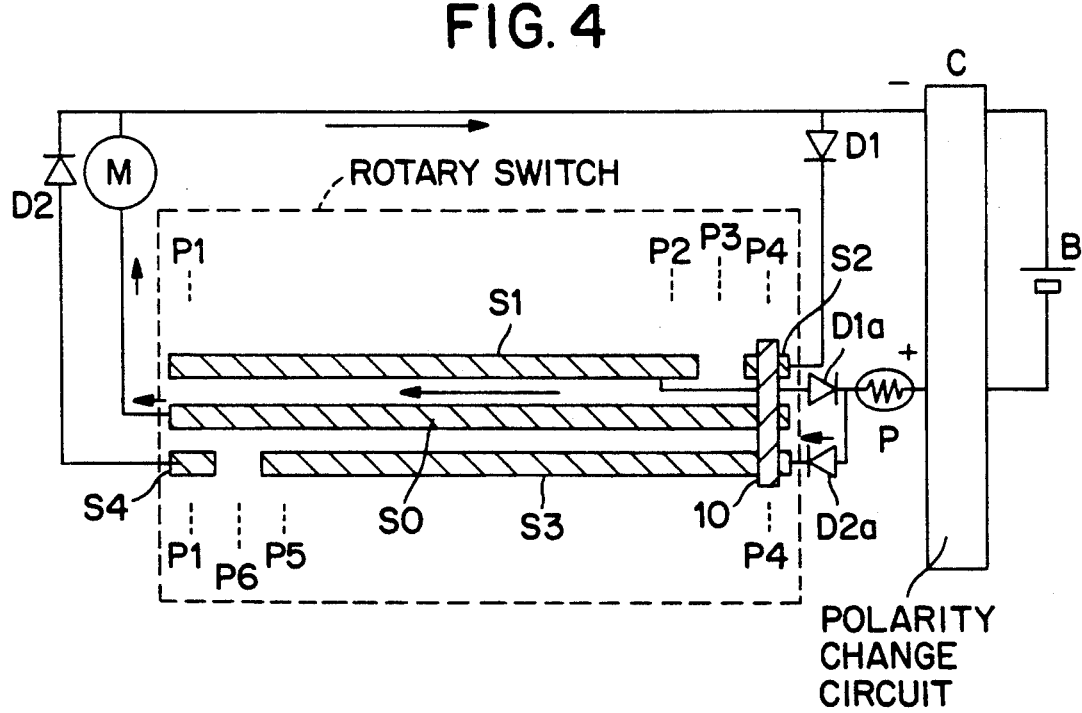

To open the damper when the damper is thus in the closed position, the polarity of the battery B is changed using the polarity switching circuit C. By this change, as shown in FIG. 4, current flows to the motor M in the reverse direction, that is, from the diode D2a, the third fixed contact S3, the movable contact 10, the common fixed contact S0 and to the motor M. Since the diode D1 is oriented in the opposite direction in this case, current does not flow in the route that contains the diode D1.

Figure 5:
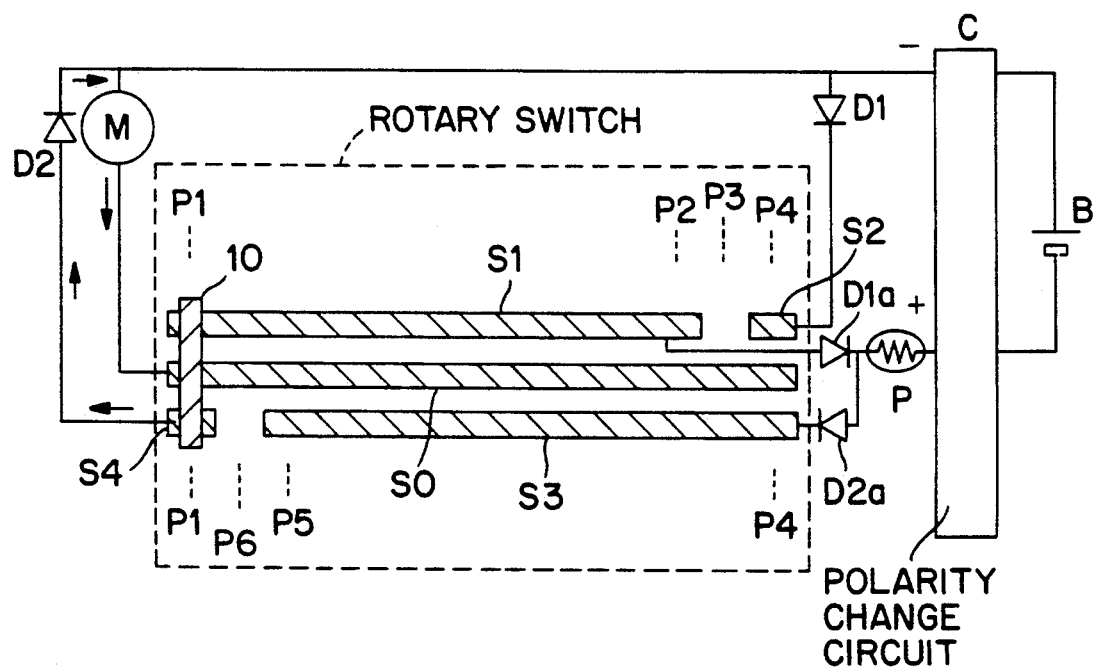

Since the current thus flows to the motor M in the reverse direction, the motor M rotates in the reverse direction, and the damper is gradually opened. When the movable contact 10 moves to the left gradually as seen in FIG. 4 and reaches position P6 from the position P5, the supply of the current to the motor M is cut off, and the motor M rotates only by the inertia. Immediately thereafter, the movable contact 10 comes into contact with the fourth fixed contact S4 at the position P1. As a result, with the supply of current form the battery B still cut off, the charge accumulated in the motor M flows in the reverse direction via the diode D2 as shown in FIG. 5, and the motor M stops instantly. When the movable contact 10 reaches position P1, the damper is in the maximum-opened position, and the damper stops instantly at this time. Accordingly, the stopping precision of the damper is also high when the damper reaches its maximum-opened position.

In order to close the damper form this position, the same operation as that described with reference to FIG. 1 is performed.

In the embodiment, the discontinuity, or a gap, is established between the fixed contacts S1 and S2 which are inside the rotary switch RS. Furthermore, the discontinuity, or a gap, is also provided between the fixed contacts S3 and S4. In addition, the motor M is short-circuited via the diodes D1 and D2 which are respectively connected to the second fixed contact S2 and fourth fixed contact S4 which do not receive any current supply from the battery B. Accordingly, no transistors are required to instantly stop the motor M by the use of an extremely low-cost device. Furthermore, the stopping precision is also extremely high; and since the damper is not stopped mechanically, the durability of the damper is superior.

In the embodiment described above, the first fixed contact S1 and second fixed contact S2 are provided on the same circumferential line i.e., on the same straight line as illustrated in FIG. 1. However, it is possible to position the first fixed contact S1 and second fixed contact S2 on different circumferential lines. It is also possible to position the third fixed contact S3 and fourth fixed contact S4 on different circumferential lines.

The embodiment is described above with reference with to a damper as an element to be operated. However, the present invention can control the drive of other parts than the damper of an automobile air conditioner. The present invention is applicable to control the drive of window glasses, rod antennas, etc.

Also, in the embodiment described above, the common fixed contact S0 is used. However, it is possible to omit the common fixed contact S0 and, instead, to connect the lead wire from the motor M to the movable contact 10.

According to the present invention, since there is no need to use transistors, the overall cost of the actuator control device is low. In addition, since the damper is stopped by short-circuiting the motor, the stopping precision is high. Moreover, since the damper is not mechanically stopped, the durability of the damper can be improved.

I claim:

1. A damper control device for an automobile air conditioner characterized in that said device comprises:
   a movable contact which is moved together with a damper;
   a first fixed contact and a second fixed contact which are installed discontinuously with respect to each other on a path along which said movable contact moves;
   a third fixed contact and a fourth fixed contact which are installed discontinuously with respect to each other on a path along which said movable contact moves;
   a motor coupled to said damper for moving said damper and said movable contact;
   a power supply which supplies power to said motor via said movable contact and said first fixed contact and also supplies power to said motor via said movable contact and said third fixed contact;
   a polarity switching circuit that switches the polarity of said power supply with respect to said motor;
   a first diode which short-circuits said motor via said movable contact and said second fixed contact; and
   a second diode which short-circuits said motor via said movable contact and said fourth fixed contact.

2. A damper control device for an automobile air conditioner according to claim 1 characterized in that a common fixed contact is installed between said motor and said movable contact.

3. A damper control device according to claim 2, wherein said first, second, third and fourth fixed contacts are arc-shaped and have the same radius.

* * * * *